United States Patent
Kim et al.

(10) Patent No.: US 9,204,137 B2
(45) Date of Patent: Dec. 1, 2015

(54) TIMING CONTROL UNIT AND APPARATUS AND METHOD FOR DISPLAYING USING THE SAME

(75) Inventors: Sung-soo Kim, Suwon-si (KR); Jong-hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 793 days.

(21) Appl. No.: 13/165,263

(22) Filed: Jun. 21, 2011

(65) Prior Publication Data

US 2011/0310096 A1    Dec. 22, 2011

(30) Foreign Application Priority Data

Jun. 21, 2010    (KR) .................. 10-2010-0058701

(51) Int. Cl.
  *G06T 15/00*    (2011.01)
  *H04N 13/04*    (2006.01)
  *H04N 13/00*    (2006.01)

(52) U.S. Cl.
  CPC ....... *H04N 13/0454* (2013.01); *H04N 13/0003* (2013.01); *H04N 13/0497* (2013.01)

(58) Field of Classification Search
  CPC ......... G09G 5/00; G09G 3/3611; G09G 3/20; G09G 3/3677; G09G 3/3648; G09G 3/3233; G09G 2310/08
  USPC .............. 345/204, 619, 214, 419; 348/51, 58, 348/E15.001, E13.075, 441
  See application file for complete search history.

(56) References Cited

U.S. PATENT DOCUMENTS

| | | | |
|---|---|---|---|
| 7,432,901 B2 | 10/2008 | Baek et al. | |
| 7,880,784 B2 * | 2/2011 | Laue et al. | 348/262 |
| 8,199,095 B2 | 6/2012 | Jung et al. | |
| 8,373,617 B2 | 2/2013 | Kim et al. | |
| 2004/0070556 A1 * | 4/2004 | Weitbruch et al. | 345/60 |
| 2004/0263454 A1 | 12/2004 | Baek et al. | |
| 2006/0126177 A1 | 6/2006 | Kim et al. | |
| 2007/0097024 A1 | 5/2007 | Jung et al. | |
| 2007/0242019 A1 | 10/2007 | Jung et al. | |
| 2009/0322858 A1 | 12/2009 | Mitsuya et al. | |
| 2010/0026794 A1 * | 2/2010 | Chang | 348/56 |
| 2010/0033555 A1 | 2/2010 | Nagase et al. | |
| 2010/0053305 A1 | 3/2010 | Guillou et al. | |

(Continued)

FOREIGN PATENT DOCUMENTS

| | | |
|---|---|---|
| CN | 1577462 A | 2/2005 |
| CN | 1784022 A | 6/2006 |

(Continued)

OTHER PUBLICATIONS

Communication dated Jul. 16, 2014 issued by the European Patent Office in counterpart European Application No. 11170499.5.

(Continued)

*Primary Examiner* — Olga Merkoulova
(74) *Attorney, Agent, or Firm* — Sughrue Mion, PLLC

(57) ABSTRACT

Provided are a timing control unit and method for adjusting a speed of a system and a display apparatus and method using the same. The display apparatus includes: a panel unit including a plurality of cells and a plurality of electrodes for driving the plurality of cells; and a driving controller which, when a three-dimensional (3D) image signal is input, sends a common signal to an electrode group combining a certain number of electrodes of the plurality of electrodes.

22 Claims, 12 Drawing Sheets

(56) References Cited

U.S. PATENT DOCUMENTS

| | | | |
|---|---|---|---|
| 2010/0253678 A1* | 10/2010 | Choi et al. | 345/419 |
| 2010/0302354 A1* | 12/2010 | Jung | 348/58 |
| 2011/0074934 A1* | 3/2011 | Ko et al. | 348/51 |
| 2011/0090308 A1* | 4/2011 | Chen et al. | 348/43 |

FOREIGN PATENT DOCUMENTS

| | | | |
|---|---|---|---|
| EP | 0 416 875 A2 | 3/1991 | |
| EP | 1 231 797 A1 | 8/2002 | |
| KR | 10-2007-0080170 A | 8/2007 | |
| KR | 10-2007-0102954 A | 10/2007 | |
| WO | WO2008123660 | * 10/2008 | G02B 27/22 |

OTHER PUBLICATIONS

Michael Harney, "Employing multiline addressing in OLED displays", Oct. 12, 2009, 2 pgs. total, XP055126372.

T N Ruckmongathan, "Driving matrix liquid crystals displays", Jul. 1, 1999, vol. 53, No. 1, pp. 199-212, XP055126315.

Altera, "White Paper High-Definition Video Deinterlacing Using FPGAs", Oct. 1, 2009, pp. 1-8, XP055126435.

Andrew Woods et al., "The use of flicker-free television for stereoscopic display applications", SPIE, Aug. 1, 1991, vol. 1457, pp. 322-326, XP055125257.

Communication dated Feb. 25, 2015 issued by the State Intellectual Property Office of The People's Republic of China in counterpart Chinese Application No. 201110167068.5.

* cited by examiner

FIG. 9

TIMING CONTROL UNIT AND APPARATUS AND METHOD FOR DISPLAYING USING THE SAME

CROSS-REFERENCE TO RELATED APPLICATION

This application claims priority from Korean Patent Application No. 10-2010-0058701, filed Jun. 21, 2010 in the Korean Intellectual Property Office, the disclosure of which is incorporated herein by reference in its entirety.

BACKGROUND

1. Field

Apparatuses and methods consistent with exemplary embodiments relate to a timing control unit and a display using the same, and more specifically, to a timing control unit for adjusting a speed of a system, a display apparatus and a display method using the same.

2. Description of the Related Art

Recently, as personal computers and televisions (TVs) become lighter and thinner, the lightweight and the thinness are also demanded in display devices. In response to this demand, a flat panel display device such as a Liquid Crystal Display (LCD) has been developed in place of a Cathode-Ray Tube (CRT) display and utilized in various fields.

To fabricate the liquid display device such as the LCD, a Thin-Film Transistor (TFT) is used, which requires a fast response time. To prevent distortion caused by the fast response time, the system is operated at a certain frequency in some cases.

For example, a three-dimensional (3D) TV including the LCD may operate the system at 240 Hz to prevent the distortion generated by the response time of the LCD. The 3D TV displays two of frames four times greater than the operation at 60 Hz, as images corresponding to a left eye and a right eye, and other two frames as black images to hide the distortion shown to a viewer when the left-eye image and the right-eye image are changed.

As discussed above, when the operating frequency of the system is high, that is, when the system speed is high, a great number of driver integrated circuits (ICs) are necessary to control the respective operations, which increases a manufacturing cost.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a timing control unit for reducing a production cost by lowering a system speed, a display apparatus and a display method using the same.

According to an aspect of an exemplary embodiment, there is provided a timing control unit including: a signal generator which generates a plurality of signals; a switch unit for sending the plurality of signals generated by the signal generator to a plurality of electrodes of a panel unit or an electrode group including a certain number of electrodes among the plurality of the electrodes; and a controller which controls the switch unit to sequentially send the generated plurality of signals to the electrode group when a 3D image signal is input, and to sequentially send the generated plurality of signals to the plurality of electrodes when a two-dimensional (2D) image signal is input.

The timing control unit may further include a 3D image processor which downscales and filters the 3D image signal.

The plurality of electrodes may be a plurality of first electrodes for designating the plurality of cells respectively, and the plurality of signals may be driving signals for driving the plurality of cells.

The plurality of electrodes may be a plurality of second electrodes for applying a data voltage according to the 3D image signal to the plurality of cells respectively, and the plurality of signals may be image data signals for the plurality of cells.

The panel unit may include: a data receiver which receives data of the 3D image signal; a data register unit which stores and outputs the received data; and a data latch unit which outputs the image data signal according to a data signal output from the data register unit.

The switch unit may switch an output of the data register unit or the data latch unit.

The voltage applied to the electrode group of the plurality of electrodes may be an opposite voltage based on a certain voltage.

According to an aspect of another exemplary embodiment, there is provided a display apparatus including: a panel unit including a plurality of cells and a plurality of electrodes which drives the plurality of cells; and a driving controller which, when a 3D image signal is input, sends a common signal to an electrode group combining a certain number of electrodes of the plurality of electrodes.

The driving controller may include: a signal generator which generates a plurality of signals; a switch unit which sends the generated plurality of signals generated by the signal generator to the panel unit; and a controller which controls the switch unit to sequentially send the generated plurality of signals to the electrode group when the 3D image signal is input, and to sequentially send the generated plurality of signals to the plurality of electrodes when a 2D image signal is input.

The display apparatus may further include a 3D image processor which downscales and filters the 3D image signal.

The display apparatus may further include a 3D image converter which converts an image signal to the 3D image signal and provides the 3D image signal.

The 3D image converter or the driving controller may include a 3D image processor which downscales and filters the 3D image signal.

The plurality of electrodes may be a plurality of first electrodes for designating the plurality of cells respectively, and the plurality of signals may be driving signals for driving the plurality of cells.

The plurality of electrodes may be a plurality of second electrodes for applying a data voltage according to the 3D image signal to the plurality of cells respectively, and the plurality of signals may be image data signals for the plurality of cells.

The panel unit may include: a data receiver which receives data of the 3D image signal; a data register unit which stores and outputs the received data; and a data latch unit which outputs the image data signal according to a data signal output from the data register unit.

The switch unit may switch an output of the data register unit or the data latch unit.

The voltage applied to the electrode group of the plurality of electrodes may be an opposite voltage based on a certain voltage.

The electrode group may include two consecutive electrodes.

According to an aspect of another exemplary embodiment, there is provided a display method of a display apparatus including a panel unit including a plurality of cells and a plurality of electrodes for driving the cells, the method including: generating a plurality of signals for the cells; and when a 3D image signal is input, sequentially sending the generated plurality of signals, as a common signal, to an electrode group combining a certain number of electrodes of the plurality of electrodes.

The display method may further include, when a 2D image signal is input, sequentially sending the generated plurality of signals to the plurality of electrodes.

The display method may further include: converting an input image signal to the 3D image signal and providing the 3D image signal; and downscaling and filtering the provided 3D image signal.

The plurality of electrodes may be a plurality of first electrodes for designating the plurality of cells respectively, and the plurality of signals may be driving signals for driving the plurality of cells.

The plurality of electrodes may be a plurality of second electrodes for applying a data voltage according to the 3D image signal to the plurality of cells respectively, and the plurality of the signals may be image data signals for the plurality of cells.

The voltage applied to the electrode group of the plurality of electrodes may be an opposite voltage based on a certain voltage.

The electrode group may include two consecutive electrodes.

According to an aspect of another exemplary embodiment, there is provided a timing control method of a display apparatus including a panel unit, the panel unit including a plurality of cells and a plurality of electrodes which drives the plurality of cells, the timing control method including: generating a plurality of signals for the plurality of cells; sequentially sending the generated plurality of signals to the plurality of electrodes when a 2D image signal is input; and sequentially sending the generated plurality of signals to an electrode group including a certain number of electrodes among the plurality of electrodes, when a 3D image signal is input.

According to various exemplary embodiments, the speed of the system can be regulated by processing the 3D input image.

BRIEF DESCRIPTION OF THE DRAWINGS

The above and/or other aspects will become more apparent by describing exemplary embodiments with reference to the accompanying drawings, in which:

FIG. 9 is a diagram of a pixel-inversion scheme in a display apparatus according to an exemplary embodiment;

DETAILED DESCRIPTION OF EXEMPLARY EMBODIMENTS

Figure 1:
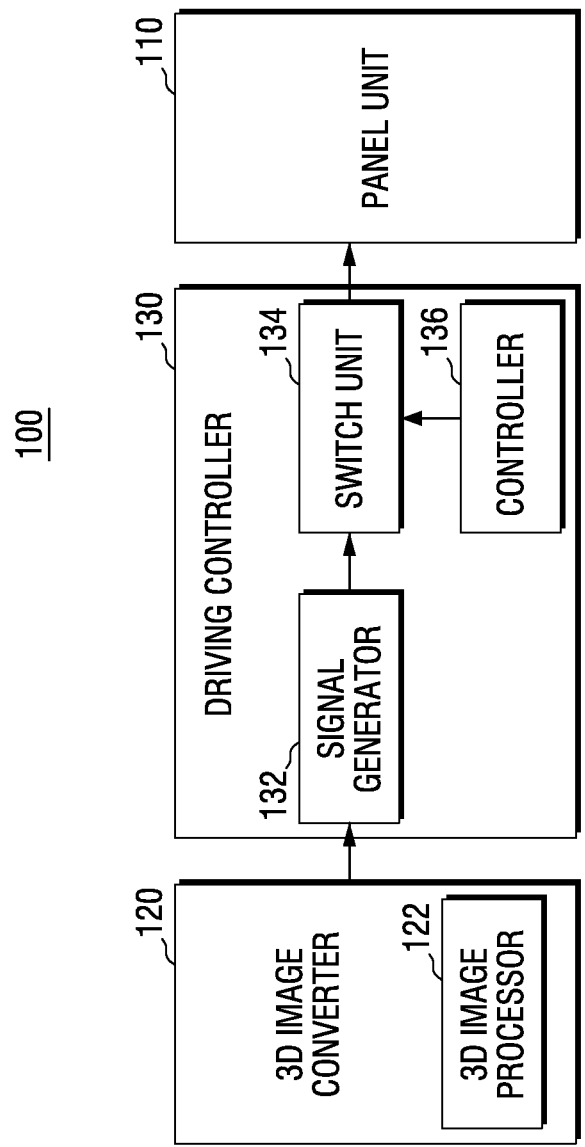
FIG. 1 is a schematic block diagram of a display apparatus according to an exemplary embodiment.

Exemplary embodiments will now be described in greater detail below with reference to the accompanying drawings.

In the following description, like drawing reference numerals are used for the like elements, even in different drawings. The matters defined in the description, such as detailed constructions and elements, are provided to assist in a comprehensive understanding of exemplary embodiments. However, an exemplary embodiment can be practiced without those specifically defined matters. Also, well-known functions or constructions are not described in detail since they would obscure the description with unnecessary detail.

Hereinafter, a display apparatus according to exemplary embodiments exemplifies a Liquid Crystal Display (LCD) by way of example. However, it is understood that the display apparatus of another exemplary embodiment is not limited to the LCD and can employ various display devices such as CRT, plasma display panel (PDP), electroluminescent display (ELD), light-emitting diode (LED) display, organic light-emitting diode (OLED) display, and field emission display (FED).

FIG. 1 is a schematic block diagram of a display apparatus 100 according to an exemplary embodiment. The display apparatus 100 includes a panel unit 110, a 3D image converter 120, and a driving controller 130 as shown in FIG. 1.

The panel unit 110 includes a plurality of cells and a plurality of electrodes for driving the cells.

The panel unit 110, which displays images using optical anisotropy, a property of liquid crystals, controls passing of the light by changing the arrangement of the liquid crystals according to an electric field. The panel unit 110 includes the plurality of the cells corresponding to respective pixels to display the image. The cells are driven by a plurality of gate electrodes arranged in a vertical line and a plurality of source electrodes arranged in a horizontal line.

The panel unit 110 uses a gate driver IC for driving the plurality of the gate electrodes and a source driver IC for driving the plurality of the source electrodes. The gate driver IC sequentially selects gate signal lines of a TFT array of the LCD and applies a scan signal, and the source driver IC changes digital data, which is image information, to a pixel voltage and applies the pixel voltage to a data signal line.

Herein, the plurality of the electrodes can be a plurality of first electrodes for designating the cells respectively. That is, the electrodes indicate the gate electrodes arranged in the vertical line of the panel unit 110.

The plurality of the electrodes can be a plurality of second electrodes for applying the data voltage according to a 3D image signal to the cells respectively. That is, the electrodes indicate the source electrodes arranged in the horizontal line of the panel unit 110.

The 3D image converter 120 converts an image signal to a 3D image signal and provides the 3D image signal. A 3D-IC operates as the 3D image converter 120 in the LCD. A Frame Rate Controller (FTC) can precede or follow the 3D image converter 120. The FRC enlarges one frame to a plurality of frames or reduces multiple frames into one frame.

The 3D image converter 120 includes a 3D image processor 122 as shown in FIG. 1. The 3D image processor 122 downscales and filters the 3D image signal.

It is assumed that 2D and 3D images output from the image converter are images corresponding to, but not limited to, 120 Hz to ease the understanding of the inventive concept. However, it is understood that the image converter can output the image corresponding to various frame rates such as 100 Hz, 200 Hz, 240 Hz, and so on.

For example, provided that the input 3D image is a Full High Definition (FHD) 120 Hz image, the 3D image processor 122 downscales the image vertically or horizontally by vertically or horizontally decimating the image by half.

As the display apparatus according to an exemplary embodiment vertically or horizontally reduces the 3D input image by half, the clock of the system can be halved to thus realize the frame rate of 240 Hz.

Herein, when downscaling the 3D image signal, the 3D image processor 122 can employ a Low Pass Filter (LPF) for image dejag and anti-aliasing in the statistical manner.

While the 3D image processor 122 is accommodated in the 3D image processor 120 as shown in FIG. 1, it is understood that another exemplary embodiment is not limited thereto, and the 3D image processor 122 can be outside the 3D image converter 120.

When the 3D image signal is input, the driving controller 130 sends a common signal to an electrode group including a certain number of the electrodes amongst the plurality of the electrodes. As shown in FIG. 1, the driving controller 130 includes a signal generator 132, a switch unit 134, and a controller 136. A Timing Controller (TCON) can operate as the driving controller 130 in the LCD.

Herein, the TCON may convert the input digital signal to a digital signal processable by the driver IC according to a size of a column screen, and generates various timing control signals used for the source driver IC and the gate driver IC.

The signal generator 134 generates a plurality of signals.

Herein, signals fed to the plurality of the first electrodes can be driving signals for driving the plurality of the cells. That is, the signals can be a gate driving voltage pulse for driving the plurality of the gate electrodes arranged in the vertical line of the panel unit 110.

Signals fed to the plurality of the second electrodes can be image data signals for the plurality of the cells. That is, the signals can be source driving data signals for driving the plurality of the source electrodes arranged in the horizontal line of the panel unit 110.

The switch unit 134 forwards the signals generated by the signal generator 132 to the panel unit 110. That is, under the control of the controller 136 (to be explained below), the switch unit 134 forwards the plurality of the signals generated by the signal generator 132 to the panel unit 110.

The controller 136 controls the switch unit 134 to sequentially send the signals to the electrode group when the 3D image signal is input, and to sequentially send the signals with respect to the electrodes when the 2D image signal is input.

More specifically, when the input image signal is the 2D image signal, the controller 136 controls the switch unit 134 to sequentially apply the signals generated by the signal generator 132 to the corresponding electrodes. When the input image signal is the 3D image signal, the controller 136 controls the switch unit 134 to sequentially apply the signals generated by the signal generator 132 to the electrode group combining the certain number of the electrodes amongst the plurality of the electrodes.

Herein, the electrode group can include two consecutive electrodes.

For example, when the 3D input image is downscaled from a 1080P (progressive) image to a 540P image by the image processor 122, the controller 136 controls the switch unit 134 to commonly apply the voltage to the two gate electrodes in sequence to display the image signal corresponding to one horizontal line over two horizontal lines of the liquid crystal so that the 540P image is displayed as the 1080P image in the panel unit 110. Herein, to commonly apply the voltage to the two gate electrodes, the voltage can be applied to the gate electrodes using one Clock Pulse Vertical (CPV) line which is a gate clock signal, or the voltage may be applied to the gate electrodes using two CPV lines. In the meantime, the LCD of a Super Patterned Vertical Alignment (SPVA) type can commonly apply the voltage to four gate electrodes.

When the image processor 122 downscales the 3D input image from a 1920-pixel image to a 960-pixel image, the controller 136 controls the switch unit 134 to commonly apply the voltage to the two source electrodes to display the image signal corresponding to one vertical line over two vertical lines of the liquid crystal so that the 960-pixel image is displayed as the 1920-pixel image in the panel unit 110. Herein, to apply the voltage to the two source electrodes in common, the voltage can be applied to the source electrodes using one dot clock, or the voltage may be applied to the source electrodes using two dot clocks. The LCD of the SPVA type can commonly apply the voltage to four source electrodes.

Figure 2:
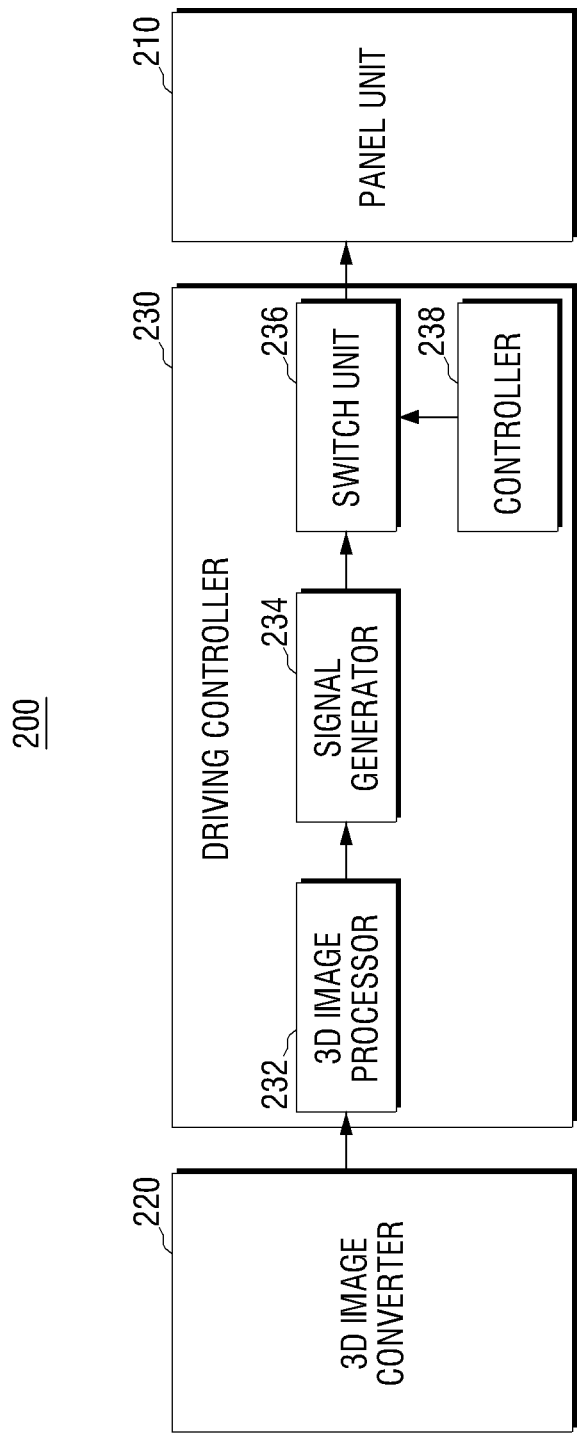
FIG. 2 is a schematic block diagram of a display apparatus according to another exemplary embodiment.

FIG. 2 is a schematic block diagram of a display apparatus 200 according to another exemplary embodiment. As shown in FIG. 2, the display apparatus 200 includes a panel unit 210, a 3D image converter 220, and a driving controller 230.

A difference between the display apparatus 200 of FIG. 2 and the display apparatus 100 of FIG. 1 lies in that the driving controller 230 includes a 3D image processor 232, and the 3D image converter 220 does not include the 3D image processor. Meanwhile, since operations of the components of FIG. 2 are identical or similar to the operations of the components of FIG. 1, detailed explanations of the components of FIG. 2 shall be omitted herein.

Figure 3:
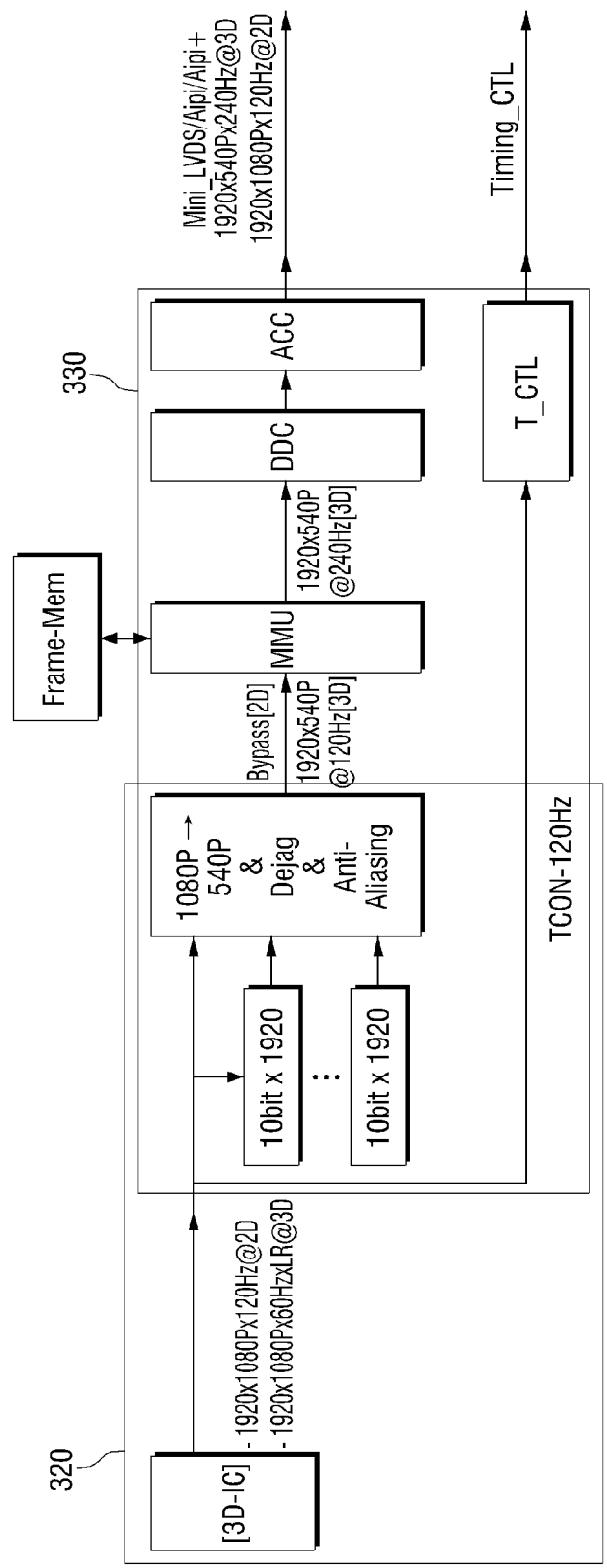
FIG. 3 is a diagram of operations of a 3D image converter and a driving controller when the display apparatus vertically down-scales an input image according to an exemplary embodiment.

FIG. 3 is a diagram of the operations of the 3D image converter and the driving controller when the display apparatus downscales the input image vertically according to an exemplary embodiment.

Hereafter, to ease the understanding, it is assumed that the 2D image is an image corresponding to 1920×1080P×120 Hz and the 3D image is an image corresponding to 1920×1080P× 60 Hz×LR. A resolution of the image output from the image converter of the display apparatus according to an exemplary embodiment is not limited to 1920×1080, but can output the image corresponding to various resolutions such as 960× 1080P, 1920×540P, etc.

A first unit 320 of FIG. 3 may correspond to the 3D image converter 120 of FIG. 1, and a second unit 330 may correspond to the driving controller 230 of FIG. 2.

As shown in FIG. 3, when the 2D image of 1920×1080P× 120 Hz is output from the 3D-IC, the first unit 320 does not perform the downscaling, the dejag, and the anti-aliasing and outputs an image signal and a timing signal corresponding to the 2D image of 1920×1080P×120 Hz through Memory Management Unit (MMU), Dynamic Capacitance Capture (DCC), and Accurate Color Capture (ACC) operations of the second unit 330.

Herein, the MMU represents a memory management device. To enhance the response speed of the LCD, the DCC compares a gray scale value of a previous frame and the gray scale value of a current frame with respect to a certain pixel and processes RGB data of Red (R), Green (G), and Blue (B) such that a value greater than the difference is added to the gray scale value of the previous frame. The ACC, to enhance the color property, increases the number of the representable gray scales without raising the number of bits of the input RGB data.

When the 3D image of 1920×1080P×60 Hz×LR is output from the 3D-IC as shown in FIG. 3, the 3D image processor of the first unit 320 or the second unit 330 vertically downscales the image to 540P image which is the ½-size image, dejags and anti-aliases the down-scaled image, and outputs an image signal and a timing signal corresponding to the 3D image of 1920×540P×240 Hz through the MMU, DCC, and ACC operations of the second unit 330.

Herein, the MMU reads a frame memory using double speed and converts the 3D image corresponding to 120 Hz to the 3D image corresponding to 240 Hz. Herein, the frame memory may be, though not limited to, 64-bit DDR by way of example, and various memories can be used as the frame memory.

An interface standard between the second unit 330 and the panel unit (not shown) may adopt, though not limited to, mini-Low Voltage Difference Signaling (LVDS), Advanced Intra-Panel Interface (AIPI), or AIPI+, and the interface between the panel unit and the driving controller corresponding to the second unit can utilize various interfaces.

In other words, when the image output from the 3D-IC is the 2D image, the first unit 320 bypasses the image. The second unit 330 performs the above-stated MMU, DCC, and ACC operations only when the image output from the 3D-IC is the 3D image.

Figure 4:
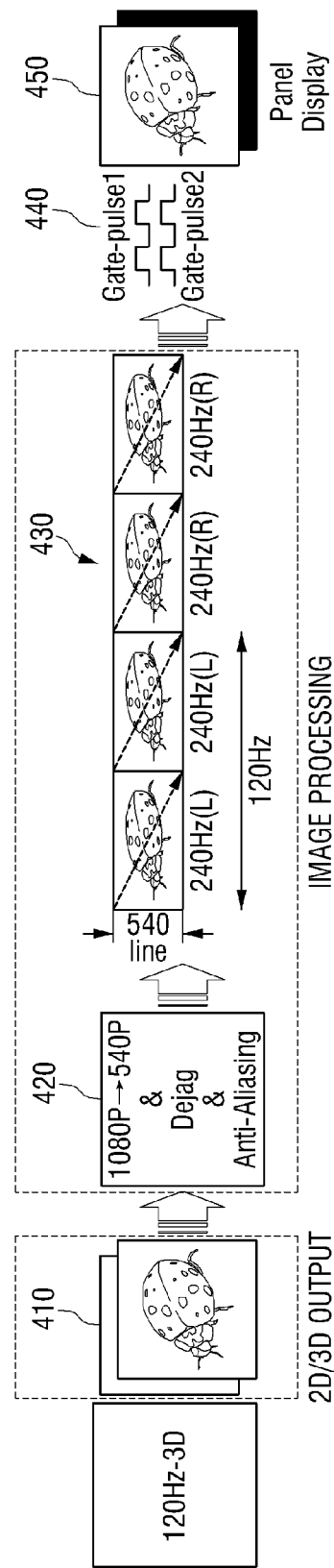
FIG. 4 is a diagram of vertical downscaling of the input image in the display apparatus of FIG. 2 according to another exemplary embodiment.

FIG. 4 is a diagram of the vertical downscaling of the image input to the display apparatus 200 of FIG. 2 according to another exemplary embodiment.

As shown in FIG. 4, when the 3D image converter 220 outputs the 3D image 410 corresponding to 120 Hz which is 120 frames in total including 60 frames for the left eye and 60 frames for the right eye, the 3D image processor 232 of the driving controller 230 vertically downscales the image to the 540P image which is the half-size image, and dejags and anti-aliases the down-scaled image in operation 420. As a result, the display apparatus 200 displays a final image 450 in the panel unit 210 according to the image signal corresponding to the 240 Hz image 430 which is the output signal of the driving controller 230 and the timing signal 440 which applies the voltage to the two gate electrodes.

Figure 5:
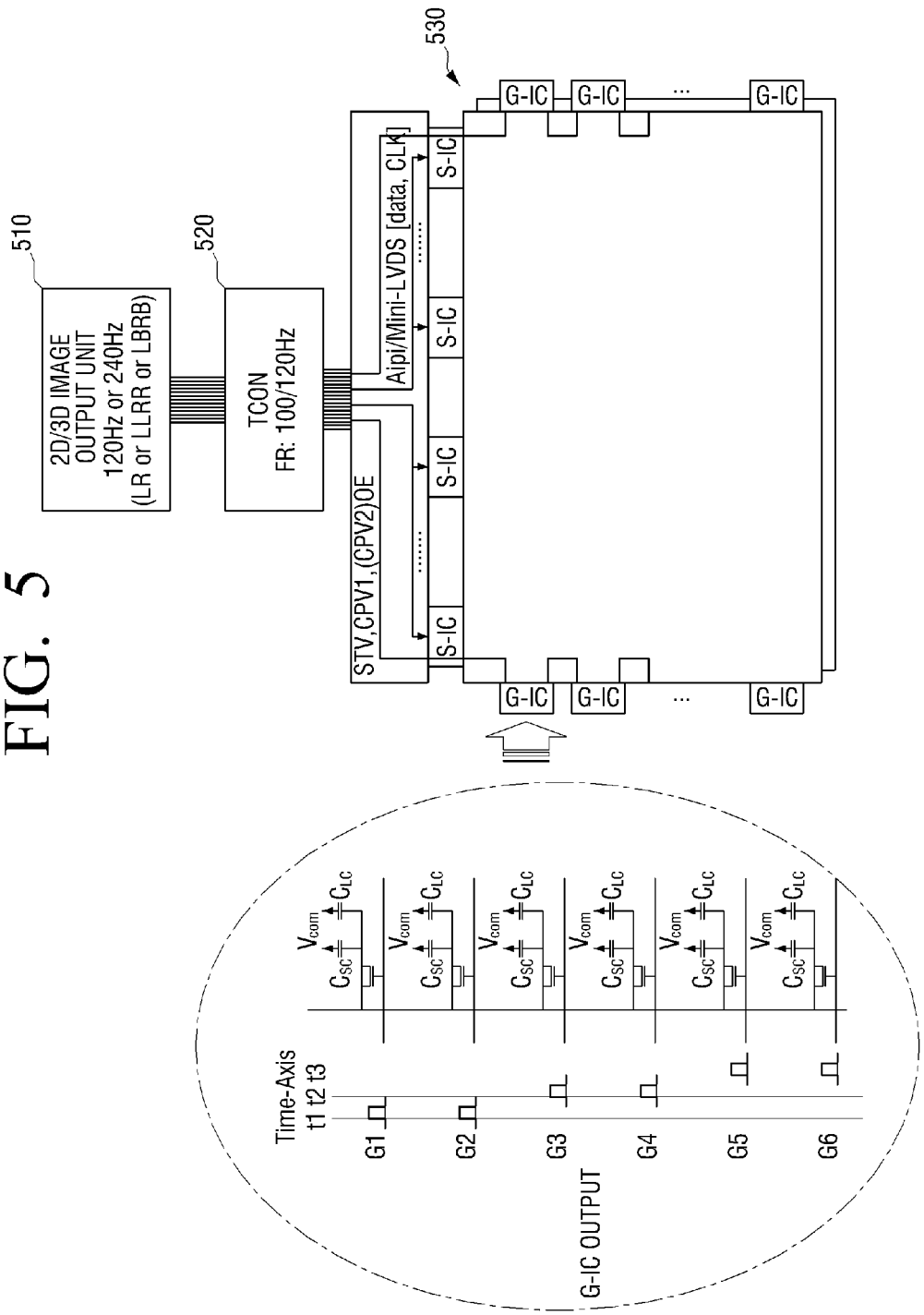
FIG. 5 is a diagram of a signal generated by a driving controller of a display apparatus, applied to a gate electrode according to an exemplary embodiment.

FIG. 5 is a diagram of the signal generated by the driving controller of the display apparatus, applied to the gate electrode according to an exemplary embodiment.

A 2D/3D image output unit 510 in FIG. 5 may correspond to the 3D image converter 120 and 220 of FIG. 1 and FIG. 2, and a TCON 520 may correspond to the driving controller 130 and 230 of FIG. 1 and FIG. 2.

As shown in FIG. 5, the 2D/3D image output unit 510 outputs the 2D or 3D image corresponding to 120 Hz or 240 Hz of the left-right frame (LR), the left-left-right-right frame (LLRR), or left-black-right-black frame (LBRB), and the voltage is sequentially applied to the two gate electrodes according to the timing signal of the TCON 520.

Thus, the display apparatus according to an exemplary embodiment can reduce the clock of the system by commonly applying the voltage to the two gate electrodes in sequence and thus decrease the production cost by lowering the driver IC manufacturing price.

Figure 6A:
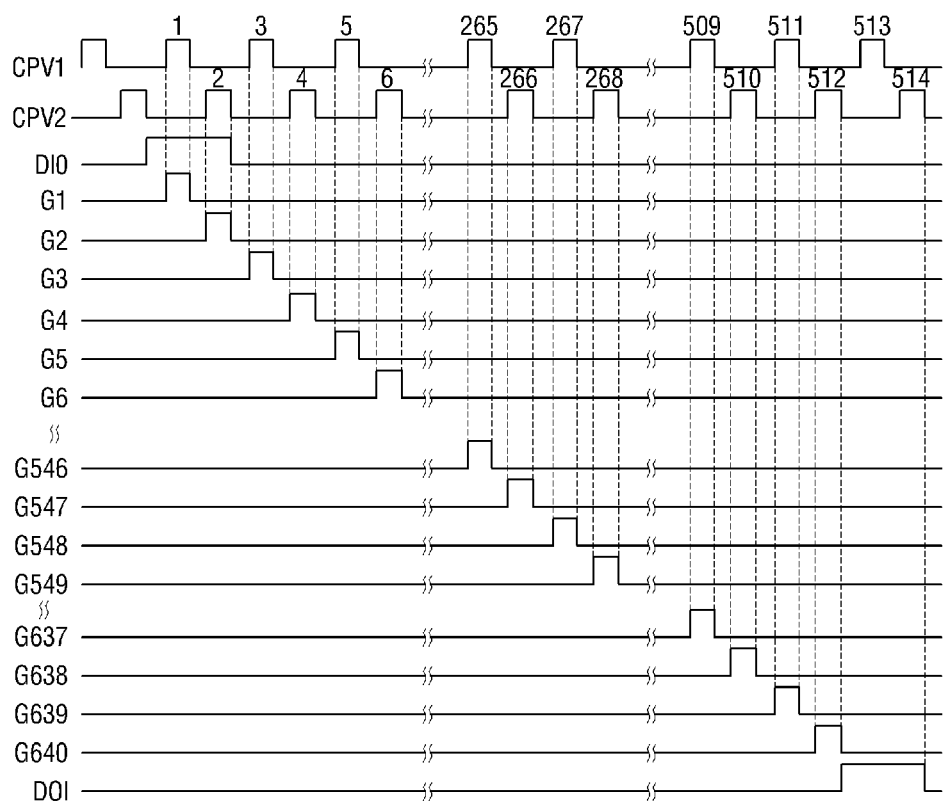
FIGS. 6A and 6B are diagrams of a gate electrode driving pulse output in 2D and 3D images.
Figure 6B:
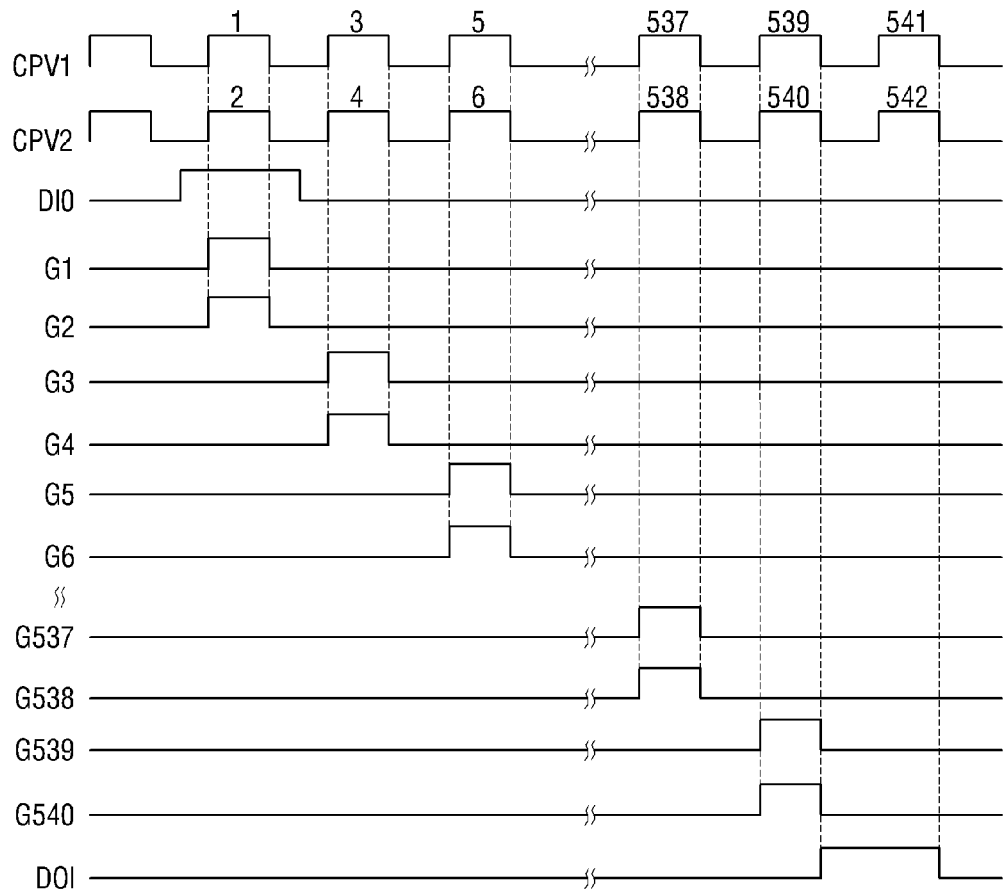

FIGS. 6A and 6B are diagrams of the gate electrode driving pulse output in the 2D and 3D images.

When the input image is the 2D image, the voltage is sequentially applied to the gate electrodes as shown in FIG. 6A. In contrast, when the input image is the 3D image, the voltage is commonly applied to the two gate electrodes as shown in FIG. 6B. While the gate clock signal CPV is operated with two lines in FIGS. 6A and 6B, it is understood that another exemplary embodiment is not limited thereto, and the gate clock signal CPV may be operated with the single CPV line.

Figure 7:
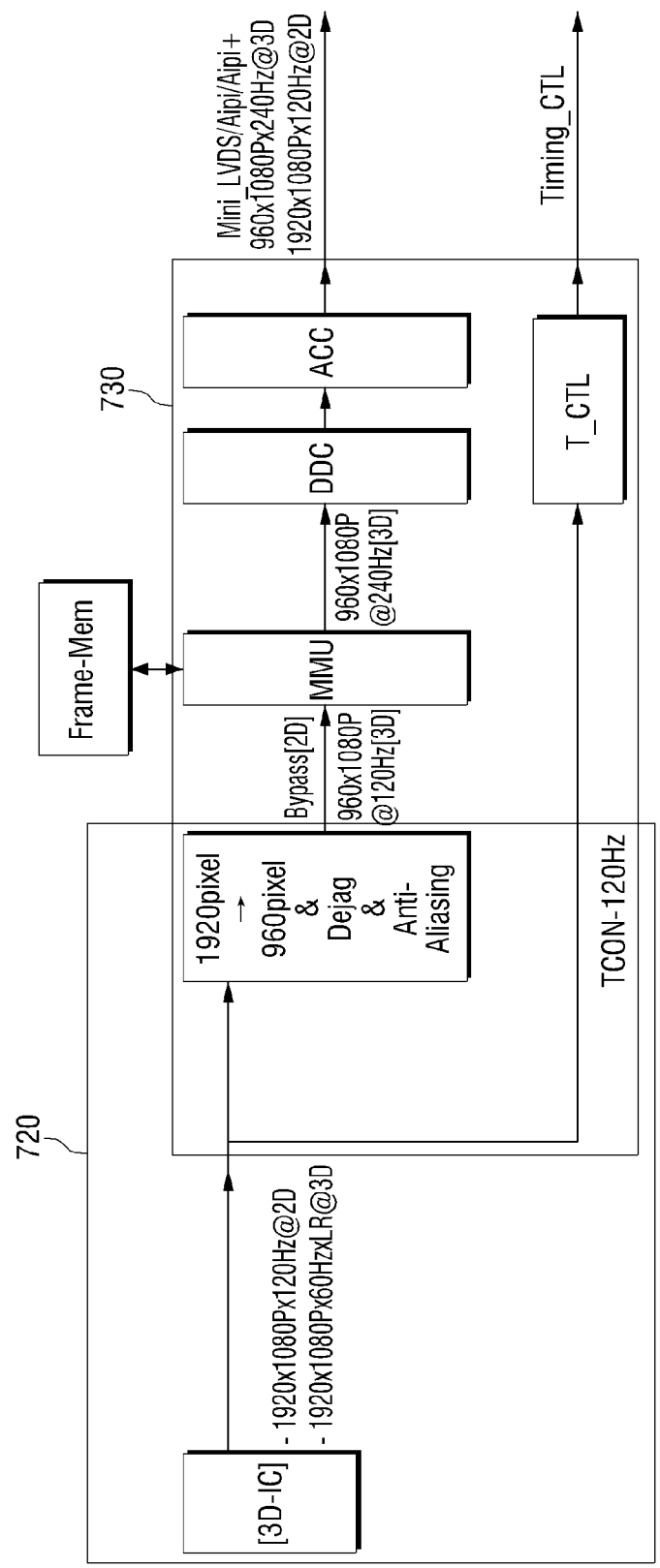
FIG. 7 is a diagram of operations of a 3D image converter and a driving controller when a display apparatus horizontally down-scales an input image according to an exemplary embodiment.

FIG. 7 is a diagram of operations of the 3D image converter and the driving controller when the display apparatus downscales the input image horizontally according to an exemplary embodiment.

A first unit 720 of FIG. 7 may correspond to the 3D image converter 120 of FIG. 1, and a second unit 730 may correspond to the driving controller 230 of FIG. 2.

Since the MMU, DCC, and ACC operations in FIG. 7 have been described in FIG. 3, they shall be omitted hereinafter.

As shown in FIG. 7, when the 2D image of 1920×1080P× 120 Hz is output from the 3D-IC, the first unit 720 does not perform the downscaling, the dejag, and the anti-aliasing and outputs an image signal and a timing signal corresponding to the 2D image of 1920×1080P×120 Hz through the MMU, DCC, and ACC operations of the driving controller 230.

When the 3D image of 1920×1080P×60 Hz×LR is output from the 3D-IC as shown in FIG. 7, the 3D image processor of the first unit 720 or the second unit 730 horizontally downscales the image to the 960-pixel image which is the ½-size image and dejags and anti-aliases the downscaled image, and outputs an image signal and a timing signal corresponding to the 3D image of 960×1080P×240 Hz through the MMU, DCC, and ACC operations of the second unit 730.

Herein, the MMU reads a frame memory using double speed and converts the 3D image corresponding to 120 Hz to the 3D image corresponding to 240 Hz. Herein, the frame memory may be, though not limited to, 64-bit DDR by way of example, and various memories can be used as the frame memory.

An interface standard between the second unit 730 and the panel unit (not shown) may adopt, though not limited to, the mini-LVDS, the AIPI, or the AIPI+, and the interface between the panel unit and the driving controller corresponding to the second unit can utilize various interfaces.

In other words, when the image output from the 3D-IC is the 2D image, the first unit 720 bypasses the image. The second unit 730 performs the above-stated MMU, DCC, and ACC operations only when the image output from the 3D-IC is the 3D image.

Figure 8:
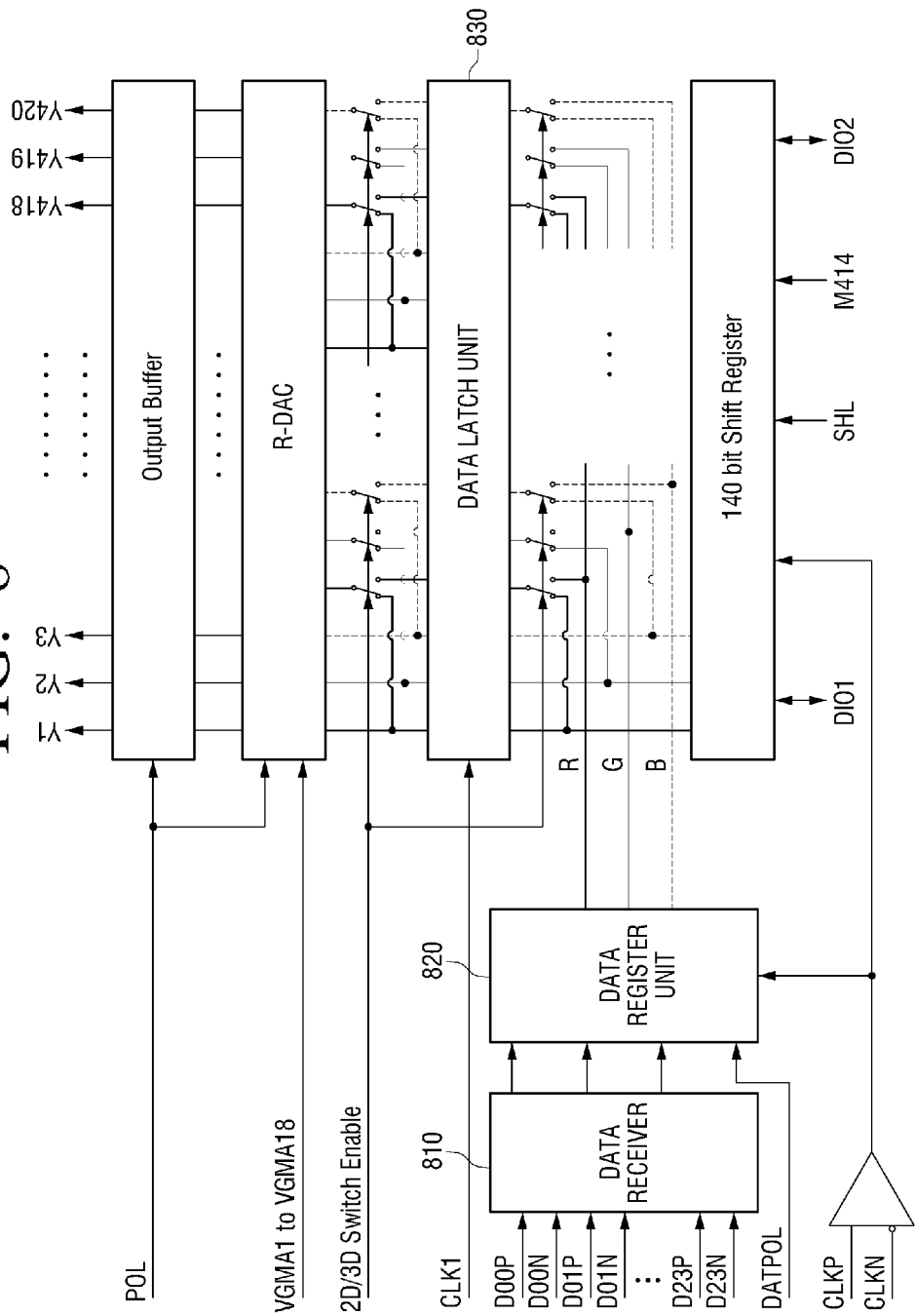
FIG. 8 is a diagram of switching of a signal applied to a source electrode at a driving controller of a display apparatus according to an exemplary embodiment.

FIG. 8 is a diagram of the switching of the signal applied to the source electrode at the driving controller of the display apparatus according to an exemplary embodiment.

As shown in FIG. 8, the source driver IC of the panel unit 110 and 210 of FIG. 1 and FIG. 2 includes a data receiver 810 for receiving data of the 3D image signal, a data register unit 820 for storing and outputting the received data, and a data latch unit 830 for outputting the image data signal according to the data signal output from the data register unit 820.

Herein, a switch shown in FIG. 8 corresponds to the switch unit 134 and 236 of FIG. 1 and FIG. 2, and switches the output of the data register unit 820 or the data latch unit 830 according to a 2D/3D switch enable signal corresponding to a control signal of the controller 136 and 238 of FIG. 1 and FIG. 2. Similar to the method of applying the common voltage to the two gate electrodes in sequence when the input image is the 3D image, the common voltage is applied to the two source electrodes corresponding to the red, the green, and the blue for the RGB data.

While the output of both of the data register unit 820 and the data latch unit 830 is controlled according to the 2D/3D switch enable signal in FIG. 8, the output of either the data register unit 820 or the data latch unit 830 may be controlled according to the 2D/3D switch enable signal in other exemplary embodiments.

Figure 9:
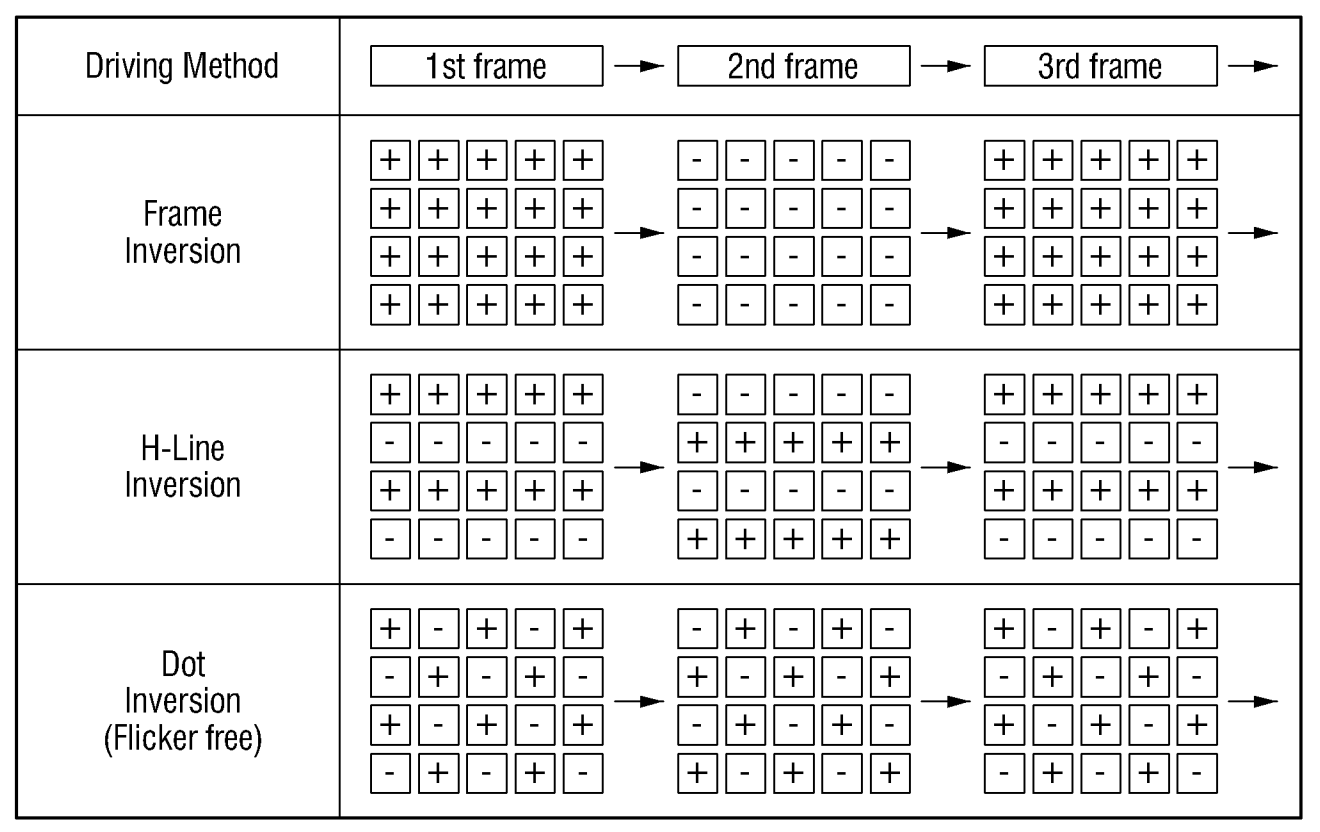

FIG. 9 is a diagram of a pixel-inversion scheme in a display apparatus according to an exemplary embodiment.

As shown in FIG. 9, the LCD can use frame inversion, H-line inversion, and dot inversion as the pixel-inversion scheme.

The display apparatus according to an exemplary embodiment can adopt the dot inversion scheme. Hence, the voltage applied to the two consecutive gate electrodes or the two consecutive source electrodes among the plurality of the electrodes can be opposite based on a certain voltage V-common.

Figure 10:
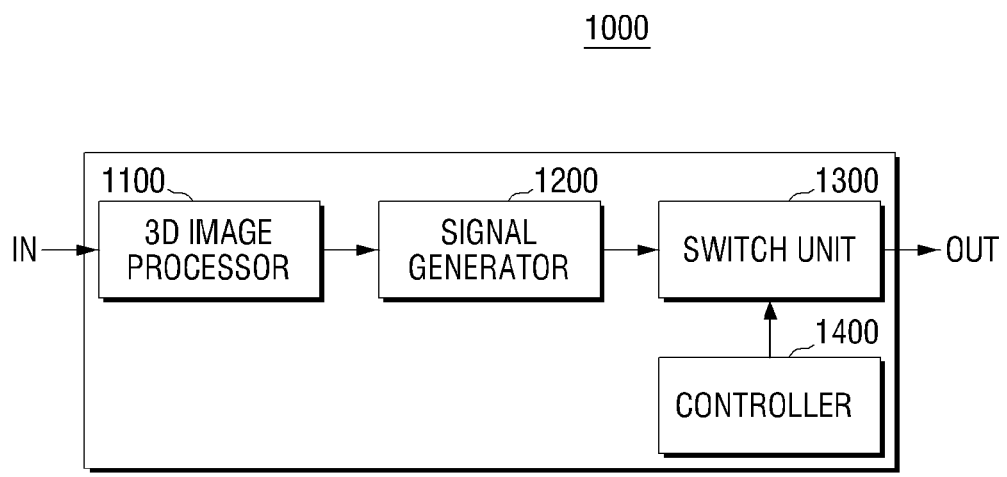
FIG. 10 is a schematic block diagram of a timing control unit according to an exemplary embodiment.

FIG. 10 is a schematic block diagram of a timing control unit 1000 according to an exemplary embodiment. As shown in FIG. 10, the timing control unit 1000 includes a 3D image processor 1100, a signal generator 1200, a switch unit 1300, and a controller 1400.

The 3D image processor 1100 downscales and filters the 3D image signal.

For example, provided that the input 3D image is the FHD 120 Hz image, the 3D image processor 1100 vertically or horizontally downscales the image by vertically or horizontally decimating the image by half.

Thus, since the timing control unit 1000 according to an exemplary embodiment vertically or horizontally reduces the 3D input image by half, the clock of the system can be halved and the frame rate of 240 Hz can be implemented.

Herein, when downscaling the 3D image signal, the 3D image processor 1100 can use the LPF to dejag and anti-aliase the image in the statistical fashion.

The signal generator 1200 generates the plurality of the signals.

Herein, the signals sent to the first electrodes can be the driving signals for driving the plurality of the cells. In other words, the signals can be the gate driving voltage pulses for driving the plurality of the gate electrodes arranged in the vertical line of the panel unit.

The signals sent to the second electrodes can be the image data signals for the plurality of the cells. In other words, the signals can be the source driving data signals for driving the plurality of the source electrodes arranged in the horizontal line of the panel unit.

The switch unit 1300 forwards the signal generated by the signal generator 1200 to the electrodes of the panel unit or the electrode group including the certain number of the electrodes amongst the plurality of the electrodes. Namely, under the control of the controller 1400 to be explained, the switch unit 1300 forwards the signals generated by the signal generator 1300 to the panel unit 110.

The controller 1400 controls the switch unit 1300 to sequentially send the signals to the electrode group when the 3D image signal is input, and to sequentially send the signals to the electrodes when the 2D image signal is input.

More specifically, the controller 1400 controls the switch unit 1300 to sequentially apply the signals generated by the signal generator 1200 to the corresponding electrodes when the input image signal is the 2D image signal, and to sequentially apply the signals generated by the signal generator 1200 to the electrode group combining the certain number of the electrodes of the plurality of the electrodes when the input image signal is the 3D image signal.

Herein, the electrodes can be the plurality of the first electrodes for designating the cells, and the signals sent to the first electrodes can be the driving signals for driving the cells. That is, the electrodes indicate the gate electrodes arranged in the vertical line of the panel unit, and the signals fed to the first electrodes can be the gate driving voltage pulses for driving the gate electrodes arranged in the vertical line of the panel unit.

The electrodes can be the second electrodes for applying the data voltage according to the 3D image signal to the cells respectively, and the signals fed to the second electrodes can be the image data signals for the cells. In other words, the electrodes can indicate the source electrodes arranged in the horizontal line of the panel unit, and the signals sent to the second electrodes can be the source driving data signals for driving the source electrodes arranged in the horizontal line of the panel unit.

In the present exemplary embodiment, the panel unit can include the data receiver for receiving the data of the 3D image signal, the data register unit for storing and outputting the received data, and the data latch unit for outputting the image data signal according to the data signal output from the data register unit, and the switch unit 1300 can switch the output of the data register unit or the data latch unit.

In the present exemplary embodiment, the voltage applied to the electrode group of the plurality of the electrodes can be opposite to each other based on the certain voltage.

Figure 11:
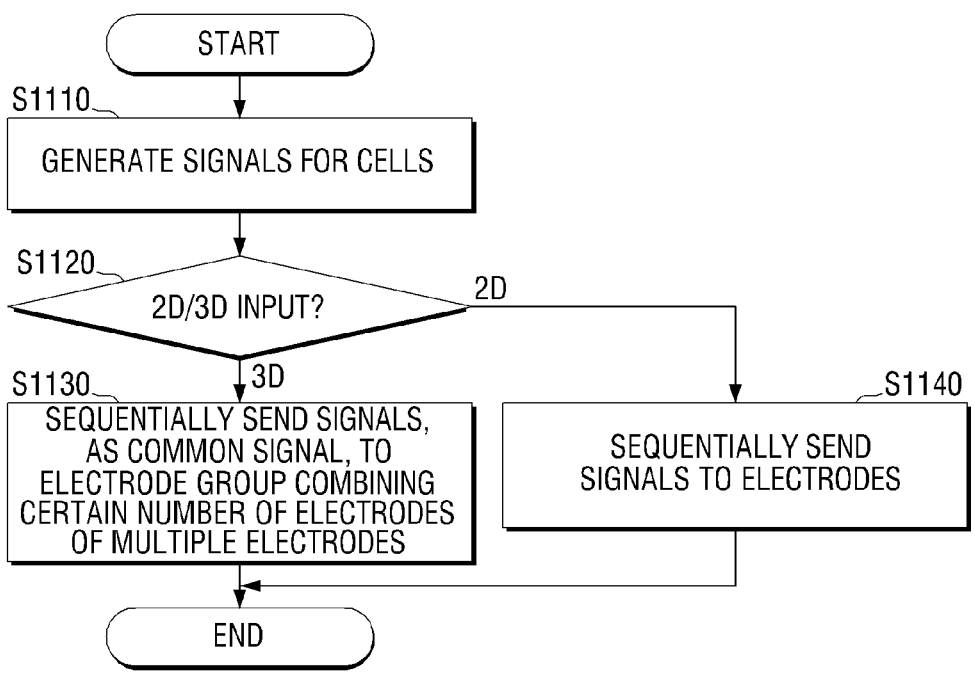
FIG. 11 is a flowchart of a display method according to an exemplary embodiment.

FIG. 11 is a flowchart of a display method according to an exemplary embodiment.

The method generates the signals for the cells of the panel unit which includes the cells and the electrodes for driving the cells (operation S1110).

In the present exemplary embodiment, the method can further include, before generating the signals (operation S1110), converting the input image signal to the 3D image signal and providing the 3D image signal, and downscaling and filtering the provided 3D image.

The method determines whether the input image signal is the 2D image signal or the 3D image signal (operation S1120).

When the 3D image signal is input, the method sequentially sends the signals, as the common signal, to each electrode group combining the certain number of the electrodes among the electrodes (operation S1130). Herein, the electrode group can include two consecutive electrodes.

When the 2D image signal is input, the method sequentially sends the signals to the electrodes (operation S1140).

Herein, the electrodes can be the plurality of the first electrodes for designating the cells, and the signals sent to the first electrodes can be the driving signals for driving the cells. That is, in this case, the electrodes indicate the gate electrodes arranged in the vertical line of the panel unit, and the signals fed to the first electrodes can be the gate driving voltage pulse for driving the gate electrodes arranged in the vertical line of the panel unit.

The electrodes can be the second electrodes for applying the data voltage according to the 3D image signal to the cells respectively, and the signals fed to the second electrodes can be the image data signals for the cells. In other words, the electrodes in this case indicate the source electrodes arranged in the horizontal line of the panel unit, and the signals sent to the second electrodes can be the source driving data signals for driving the source electrodes arranged in the horizontal line of the panel unit.

In the present exemplary embodiment, the voltage applied to the electrode group of the electrodes can be opposite to each other based on the certain voltage.

The display method as set forth above can be realized as program commands executable through various computer means and recorded to a computer-readable recording medium. The computer-readable recording medium can contain program commands, data files, and data structures alone or in combination. The program commands recorded to the recording medium can be specially designed or constructed for exemplary embodiments, or well-known to those skilled in computer software.

The computer-readable recording medium includes magnetic media such as hard disk, floppy disk, and magnetic tape, optical media such as CD-ROM and DVD, magneto-optical media such as floptical disk, and hardware devices containing and executing program commands, such as ROM, RAM, and flash memory. The recording medium can be a transmission medium, such as optical or metallic line and waveguide, including subcarriers which carry signals to define program commands and data structure.

The program command includes not only machine language codes created by a compiler but also high-level language codes executable by the computer using an interpreter. To fulfill the present operations, the hardware device can include one or more software modules, and vice versa. Moreover, it is understood that one or more of the above-described components can include a processor or microprocessor executing a computer program stored in a computer-readable medium.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
    a panel unit comprising a plurality of cells and a plurality of electrodes which drive the plurality of cells; and
    a three-dimensional (3D) image processor which processes an image signal, wherein when the image signal is a three-dimensional (3D) image signal of a 3D image, the 3D image processor downscales the 3D image signal to a downscaled 3D image signal, wherein the downscaled 3D image signal corresponds to a reduced size of the 3D image;
    a driving controller which sends a plurality of driving signals to the plurality of electrodes when a 2D image signal is received, and sends the plurality of driving signals to the plurality of electrodes grouped as a plurality of electrode groups when the downscaled 3D image signal is received, each electrode group of the plurality of electrode groups including at least two electrodes of the plurality of electrodes,
    wherein when the 2D image signal is received, each electrode of the plurality of electrodes receives a corresponding signal of the plurality of driving signals during a time period different from time periods during which other electrodes of the plurality of electrodes receive corresponding signals of the plurality of driving signals, and
    wherein when the downscaled 3D image signal is received, each of the at least two electrodes of each electrode group of the plurality of electrode groups receives a corresponding driving signal of the plurality of driving signals during a same time period.

2. The display apparatus of claim 1, wherein the driving controller comprises:
    a signal generator which generates the plurality of driving signals;
    a switch unit which sends the plurality of driving signals to the panel unit; and
    a controller which controls the switch unit to sequentially send the plurality of driving signals to the plurality of electrodes when the 2D image signal is received, and sequentially send the plurality of driving signals to the plurality of electrode groups when the downscaled 3D image signal is received.

3. The display apparatus of claim 2,
    wherein the 3D image processor filters the downscaled 3D image signal, and
    wherein the panel unit displays the 3D image signal downscaled and filtered in the 3D image processor.

4. The display apparatus as claimed in claim 3, wherein the controller displays a 2D image of a first resolution on the panel unit according to a first frame rate when the 2D image signal is received, and displays a 3D image of a second resolution lower than the first resolution on the panel unit according to a second frame rate higher than the first frame rate when the downscaled 3D image signal is received.

5. The display apparatus as claimed in claim 4, wherein:
    the electrode groups include consecutively arranged two electrodes, respectively,
    the second frame rate is twice as high as the first frame rate, and
    the second resolution is half of the first resolution.

6. The display apparatus of claim 5, wherein:
    the plurality of electrodes are a plurality of gate electrodes included in the panel unit or a plurality of source electrodes included in the panel unit.

7. The display apparatus of claim 6, wherein:
    the plurality of electrodes are a plurality of source electrodes included in the panel unit,
    the panel unit comprises:
    a data receiver which receives data of the downscaled 3D image signal,
    a data register unit which stores and outputs the received data, and
    a data latch unit which outputs the image data signal according to a data signal output from the data register unit; and
    the switch unit switches an output of the data register unit or the data latch unit.

8. A display method of a display apparatus comprising a panel unit, the panel unit comprising a plurality of cells and a plurality of electrodes which drive the plurality of cells, the display method comprising:
    when an image signal is a three-dimensional (3D) image signal of a 3D image, downscaling the 3D image signal to a downscaled 3D image signal, wherein the downscaled 3D image signal corresponds to a reduced size of the 3D image;
    generating a plurality of driving signals for the plurality of cells; and
    sending the plurality of driving signals to the plurality of electrodes when a 2D image signal is received, and sending the plurality of driving signals to the plurality of electrodes grouped as a plurality of electrode groups when the downscaled 3D image signal is received, each electrode group of the plurality of electrode groups including at least two electrodes of the plurality of electrodes, wherein when the 2D image signal is received, each electrode of the plurality of electrodes receives a corresponding signal of the plurality of driving signals during a time period different from time periods during which other electrodes of the plurality of electrodes receive corresponding signals of the plurality of driving signals, and wherein when the downscaled 3D image signal is received, each of the at least two electrodes of each electrode group of the plurality of electrode groups receives a corresponding signal of the plurality of driving signals during a same time period.

9. The display method of claim 8, further comprising:
filtering the downscaled 3D image signal; and
displaying the downscaled and filtered 3D image signal.

10. The display method as claimed in claim 9, wherein the displaying comprises displaying a 2D image of a first resolution on the panel unit according to a first frame rate mode when the 2D image signal is received, and displaying a 3D image of a second resolution lower than the first resolution on the panel unit according to a second frame rate higher than the first frame rate when the downscaled 3D image signal is received.

11. The display method as claimed in claim 10, wherein:
the electrode groups include consecutively arranged two electrodes, respectively,
the second frame rate is twice as high as the first frame rate, and
the second resolution is half of the first resolution.

12. The display method as claimed in claim 11, wherein the plurality of electrodes are a plurality of gate electrodes included in the panel unit or a plurality of source electrodes included in the panel unit.

13. The display method of claim 8, wherein the sending the plurality of driving signals converts the 3D image signal from a 3D image signal corresponding to a first system speed to a 3D image signal corresponding to a second system speed faster than the first system speed.

14. A timing control method of a display apparatus comprising a panel unit, the panel unit comprising a plurality of cells and a plurality of electrodes which drives the plurality of cells, the timing control method comprising:
when an image signal is a three-dimensional (3D) image signal of a 3D image, downscaling the 3D image signal to a downscaled 3D image signal, wherein the downscaled 3D image signal corresponds to a reduced size of the 3D image;
generating a plurality of driving signals for the plurality of cells;
sending the plurality of driving signals to the plurality of electrodes when a 2D image signal is received, and sending the plurality of driving signals to the plurality of electrodes grouped as a plurality of electrode groups when the downscaled 3D image signal is received, each electrode group of the plurality of electrode group including at least two electrodes of the plurality of electrodes,
wherein when the 2D image signal is received, each electrode of the plurality of electrodes receives a corresponding signal of the plurality of driving signals during a time period different from time periods during which other electrodes of the plurality of electrodes receive corresponding signals of the plurality of driving signals, and wherein when the downscaled 3D image signal is received, each of the at least two electrodes of each electrode group of the plurality of electrode groups receives a corresponding common driving signal of the plurality of driving signals during a same time period.

15. A non-transitory computer readable recording medium having recorded thereon a program executable by a computer for performing the method of claim 8.

16. A non-transitory computer readable recording medium having recorded thereon a program executable by a computer for performing the method of claim 14.

17. A timing control unit comprising:
a three-dimensional (3D) image processor configured to process an image signal, wherein when the image signal is a three-dimensional (3D) image signal of a 3D image, the 3D image processor downscales the 3D image signal to a downscaled 3D image signal, wherein the downscaled 3D image signal corresponds to a reduced size of the 3D image;
a signal generator configured to generate a plurality of driving signals;
a switch unit configured to send the plurality of driving signals to a plurality of electrodes included in a panel unit; and
a controller configured to control the switch unit to send the plurality of driving signals to the plurality of electrodes when a 2D image signal is received, and send the plurality of driving signals to a plurality of electrode groups when the downscaled 3D image signal is received, each electrode group of the plurality of electrode groups including at least two electrodes of the plurality of electrodes,
wherein when the 2D image signal is received, each electrode of the plurality of electrodes receives a corresponding signal of the plurality of driving signals during a time period different from time periods during which other electrodes of the plurality of electrodes receive corresponding signals of the plurality of driving signals, and
when the downscaled 3D image signal is received, each of the at least two electrodes of each electrode group of the plurality of electrode groups receives a corresponding signal of the plurality of driving signals during a same time period.

18. The timing control unit as claimed in claim 17, wherein the 3D image processor filters the downscaled 3D image signal.

19. The timing control unit as claimed in claim 18, the timing control unit outputs a 2D image of a first resolution on the panel unit according to a first frame when the 2D image signal is received, and outputs a 3D image of a second resolution lower than the first resolution on the panel unit according to a second frame rate higher than the first frame rate when the downscaled 3D image signal is received.

20. The timing control unit as claimed in claim 19, wherein:
the electrode groups include consecutively arranged two electrodes, respectively,
the second frame rate is twice as high as the first frame rate, and
the second resolution is half of the first resolution.

21. The timing control unit as claimed in claim 20, wherein the plurality of electrodes are a plurality of gate electrodes included in the panel unit or a plurality of source electrodes included in the panel unit.

22. The timing control unit as claimed in claim 21, wherein: the plurality of electrodes are the plurality of source electrodes included in the panel unit.

* * * * *